United States Patent
Monma

(10) Patent No.: US 10,890,257 B2
(45) Date of Patent: Jan. 12, 2021

(54) SEALING DEVICE

(71) Applicant: NOK CORPORATION, Tokyo (JP)

(72) Inventor: Hiroaki Monma, Fujisawa (JP)

(73) Assignee: NOK CORPORATION, Tokyo (JP)

(*) Notice: Subject to any disclaimer, the term of this patent is extended or adjusted under 35 U.S.C. 154(b) by 82 days.

(21) Appl. No.: 16/327,091

(22) PCT Filed: Aug. 9, 2017

(86) PCT No.: PCT/JP2017/028875
§ 371 (c)(1),
(2) Date: Feb. 21, 2019

(87) PCT Pub. No.: WO2018/037918
PCT Pub. Date: Mar. 1, 2018

(65) Prior Publication Data
US 2019/0178383 A1    Jun. 13, 2019

(30) Foreign Application Priority Data
Aug. 24, 2016 (JP) .................. 2016-163738

(51) Int. Cl.
 *F16J 15/3236* (2016.01)
 *F16J 15/3232* (2016.01)
 (Continued)

(52) U.S. Cl.
 CPC ....... *F16J 15/3236* (2013.01); *F16J 15/3232* (2013.01); *F16J 15/18* (2013.01); *F16J 15/3212* (2013.01)

(58) Field of Classification Search
 CPC .. F16J 15/3208; F16J 15/3212; F16J 15/3232; F16J 15/3236; F16J 15/3268; F16J 15/3276
 See application file for complete search history.

(56) References Cited

U.S. PATENT DOCUMENTS 3,527,507 A * 9/1970 Clark ................. F16C 33/20
                                                384/16
3,612,551 A * 10/1971 Grabill, Jr. ........ F16J 15/3236
                                                277/566
(Continued)

FOREIGN PATENT DOCUMENTS

CN    101398085 A    4/2009
CN    101317029 B    10/2012
(Continued)

OTHER PUBLICATIONS

JP2005147317A Machine Translation. Available espace.net. Retrieved Jul. 11, 2020 (Year: 2005).*
(Continued)

*Primary Examiner* — Nicholas L Foster
(74) *Attorney, Agent, or Firm* — Harness, Dickey & Pierce, P.L.C.

(57) ABSTRACT

A sealing device capable of preventing, when a shaft and a housing move relative to each other, the sealing device from moving together with the shaft. A resin seal ring 100 includes a cylindrical section 110, a pair of inner circumference lips 120 respectively provided on both sides of the cylindrical section 110 in the axial direction, a pair of outer circumference lips 130 respectively provided on both sides of the cylindrical section 110 in the axial direction, and an annular mounting groove 111 which is provided on an outer circumference surface of the cylindrical section 110 and in which the elastic seal ring 300 is mounted. The pair of inner circumference lips 120 are configured to slide on an outer circumference surface of the shaft. The pair of outer circumference lips 130 are configured to be in close contact with the inner circumference surface of the shaft hole.

4 Claims, 4 Drawing Sheets

(51) Int. Cl.
  *F16J 15/3212*  (2016.01)
  *F16J 15/18*  (2006.01)

(56) References Cited

U.S. PATENT DOCUMENTS

| | | | |
|---|---|---|---|
| 5,979,904 A | 11/1999 | Balsells | |
| 5,984,316 A * | 11/1999 | Balsells | F16J 15/3212 277/553 |
| 7,637,508 B2 | 12/2009 | Montipo | |
| 10,145,474 B2 * | 12/2018 | Schuhmacher | F16J 15/3236 |
| 2009/0108540 A1 * | 4/2009 | Kolb, Jr. | F04D 29/102 277/562 |
| 2014/0197599 A1 | 7/2014 | Nahrwold et al. | |
| 2017/0219099 A1 * | 8/2017 | Schuhmacher | F16J 15/3208 |

FOREIGN PATENT DOCUMENTS

| | | |
|---|---|---|
| CN | 103925366 A | 7/2014 |
| DE | 3443278 A1 | 5/1986 |
| DE | 3626067 C1 | 4/1990 |
| EP | 1892444 A1 | 2/2008 |
| EP | 2754929 A1 | 7/2014 |
| JP | S63-037868 U | 3/1988 |
| JP | H04102766 A | 4/1992 |
| JP | 2005-147317 A | 6/2005 |
| JP | 2014-137139 A | 7/2014 |
| WO | 2016/091419 A1 | 6/2016 |

OTHER PUBLICATIONS

DE3626067C1 Machine Translation. Available espace.net. Retrieved Jul. 11, 2020 (Year: 1990).*
Extended European Search Report dated Mar. 18, 2020 (corresponding to EP 17843403.1).
Chinese Office Action dated Jul. 13, 2020 (corresponding to CN 201780051705.8).

* cited by examiner

SEALING DEVICE

CROSS-REFERENCE TO RELATED APPLICATIONS

This application is a National Stage of International Application No. PCT/JP2017/028875, filed Aug. 9, 2017 (now WO 2018/037918A1), which claims priority to Japanese Application No. 2016-163738, filed Aug. 24, 2016. The entire disclosures of each of the above applications are incorporated herein by reference.

FIELD

The present disclosure relates to a sealing device that seals an annular gap between a shaft and a housing that move relative to each other.

BACKGROUND

For a sealing device that seals an annular gap between a shaft and a housing that move relative to each other, a technique for causing the sealing device to exert an excellent sealing function on both sides in an axial direction has been examined. FIG. 4 is a schematic sectional view of a sealing structure using a sealing device based on a reference example technique. A sealing device 700 shown in FIG. 4 exerts a function of sealing an annular gap between a shaft 500 and a housing 600 that move relative to each other. An annular cutout 610 is provided on an inner circumference surface of a shaft hole of the housing 600, and an annular member 650 is attached to the distal end of the housing 600. These form an annular groove to which the sealing device 700 is attached. The sealing device 700 is made of a resin material. The sealing device 700 includes a pair of inner circumference lips 710 and a pair of outer circumference lips 720 respectively provided on both sides of a cylindrical section in the axial direction. The pair of inner circumference lips 710 is configured to slide on the outer circumference surface of the shaft 500. The pair of outer circumference lips 720 is configured to be in close contact with the inner circumference surface of the shaft hole of the housing 600. This configuration intends to cause the sealing device 700 to be fixed to the housing 600 and ensure the shaft 500 and the pair of inner circumference lips 710 to slide with each other, whereby the sealing performance is maintained when the shaft 500 and the housing 600 move relative to each other.

However, when used under a high-temperature environment, the inner circumference lips 710 may be reduced in diameter, and then a tightening force of the inner circumference lips 710 with respect to the shaft 500 may increase, resulting in the sealing device 700 moving together with the shaft 500. Consequently, under a usage condition in which the shaft 500 and the housing 600 move relative to each other, the sealing device 700 may come into contact with a wall surface of the annular groove, then the inner circumference lips 710 and the outer circumference lips 720 may be deformed, thereby the sealing performance may be deteriorated. Under a usage condition in which the shaft 500 and the housing 600 rotate or swing relative to each other, the outer circumference lips 720 may slide on the inner circumference surface of the shaft hole of the housing 600, then a sliding wear may occur in the outer circumference lips 720, thereby the sealing performance may be deteriorated.

Rigidity of the sealing device 700 made of resin is high compared with a sealing device made of a rubber-like elastic body. Therefore, when the annular groove is formed on the inner circumference surface of the shaft hole of the housing 600 and the sealing device 700 is mounted in the groove, as explained above, it is necessary to provide the annular cutout 610 in the housing 600 and mount the sealing device 700 in the cutout 610 and, thereafter, attach the annular member 650. Under a usage condition in which the shaft 500 and the housing 600 reciprocate relative to each other, the annular groove is to be formed in the reference example technique shown in FIG. 4 in order to prevent the sealing device 700 from slipping off from the shaft hole of the housing 600. Therefore, the annular member 650 is to be attached to the housing 600. This leads to an increase in the number of components.

CITATION LIST

Patent Literature

[PTL 1] Japanese Patent Application Laid-open No. 2014-137139

SUMMARY

Technical Problem

An object of the present disclosure is to provide a sealing device capable of preventing, when a shaft and a housing move relative to each other, the sealing device from moving together with the shaft.

Solution to Problem

The present disclosure adopts the following means in response to the above issue.

That is, a sealing device of the present disclosure is a sealing device that seals an annular gap between a shaft and a housing that move relative to each other.

The sealing device includes a seal ring made of resin, and a seal ring made of a rubber-like elastic body, the elastic seal ring being attached to an outer circumference surface side of the resin seal ring and being in close contact with an inner circumference surface of a shaft hole through which the shaft is inserted in the housing.

The resin seal ring includes a cylindrical section, a pair of inner circumference lips respectively provided on both sides of the cylindrical section in an axial direction, a pair of outer circumference lips respectively provided on both sides of the cylindrical section in the axial direction, and an annular mounting groove which is provided on an outer circumference surface of the cylindrical section and in which the elastic seal ring is mounted.

Each of the pair of inner circumference lips is reduced in diameter with distance from the cylindrical section both on an inner circumference surface side and on an outer circumference surface side toward lip distal ends, which are configured to slide on an outer circumference surface of the shaft.

Each of the pair of outer circumference lips is increased in diameter with distance from the cylindrical section both on an inner circumference surface side and on an outer circumference surface side toward lip distal ends, which are configured to be in close contact with the inner circumference surface of the shaft hole.

According to the present disclosure, the elastic seal ring made of the rubber-like elastic body which is in close contact with the inner circumference surface of the shaft hole of the housing is mounted in the annular mounting groove provided on the outer circumference surface of the cylindrical section in the resin seal ring. This prevents the resin seal ring from moving with respect to the housing. Consequently, the resin seal ring is prevented from moving together with the shaft, thereby the sealing device is prevented from moving together with the shaft.

The pair of inner circumference lips of the resin seal ring is configured to be reduced in diameter with distance from the cylindrical section both on the inner circumference surface side and on the outer circumference surface side toward the lip distal ends, which are configured to slide on the outer circumference surface of the shaft. This prevents a part other than the lip distal ends from coming into contact with the outer circumference surface of the shaft. Thus, the resin seal ring can be more surely prevented from moving together with the shaft.

The pair of outer circumference lips of the resin seal ring is configured to be increased in diameter with distance from the cylindrical section both on the inner circumference surface side and on the outer circumference surface side toward the lip distal ends, which are in close contact with the inner circumference surface of the shaft hole. This enables the pair of outer circumference lips to easily bend radially inwardly. This allows the elastic seal ring to be easily amounted in the mounting groove, thereby a load applied on the elastic seal ring can be reduced. Further, the elastic seal ring can be more surely in close contact with the shaft hole inner circumference surface.

Advantageous Effects of the Disclosure

As explained above, according to the present disclosure, when the shaft and the housing move relative to each other, it is possible to prevent the sealing device from moving together with the shaft.

DRAWINGS

DETAILED DESCRIPTION

A mode for carrying out the present disclosure is illustratively explained in detail below on the basis of an embodiment with reference to the drawings. However, the scope of the present disclosure is not limited to dimensions, materials, shapes, relative disposition, and the like of components described in the embodiment, unless specifically described otherwise.

Embodiment

Figure 1:
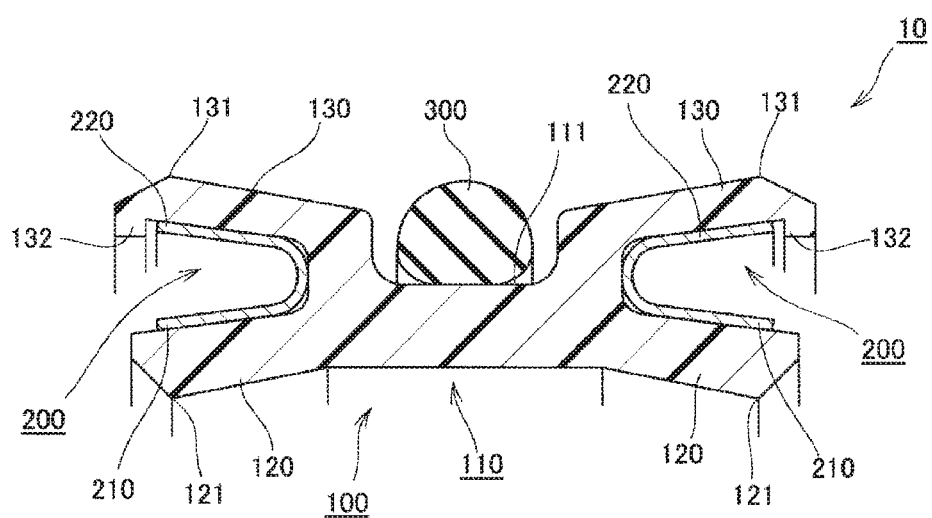
FIG. 1 is a schematic sectional view of a sealing device according to an embodiment of the present disclosure.
Figure 2:
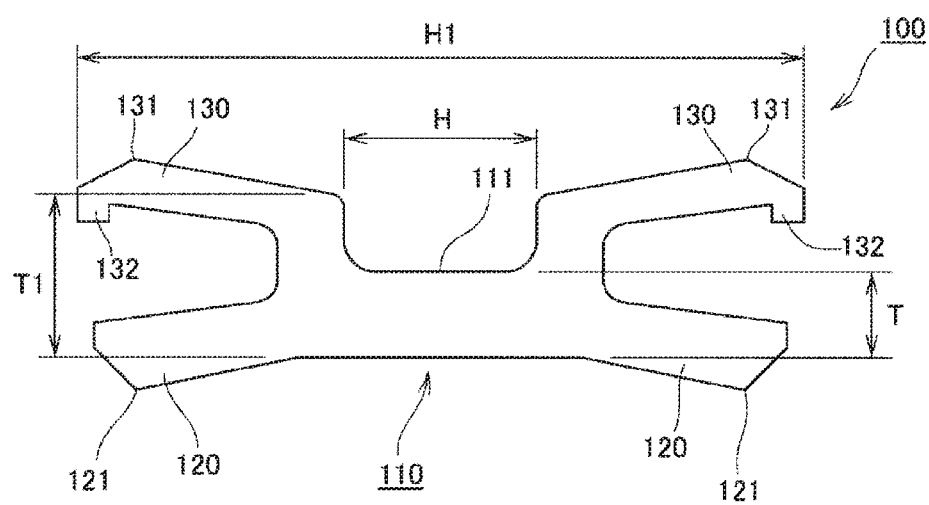
FIG. 2 is a schematic sectional view of a resin seal ring according to the embodiment of the present disclosure.
Figure 3:
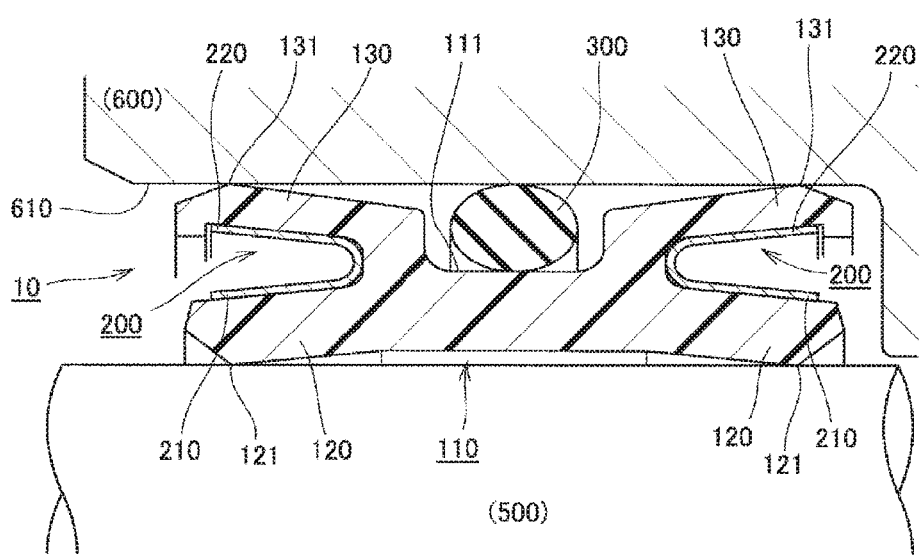
FIG. 3 is a schematic sectional view of a sealing structure in which the sealing device according to the embodiment of the present disclosure is used.
Figure 4:
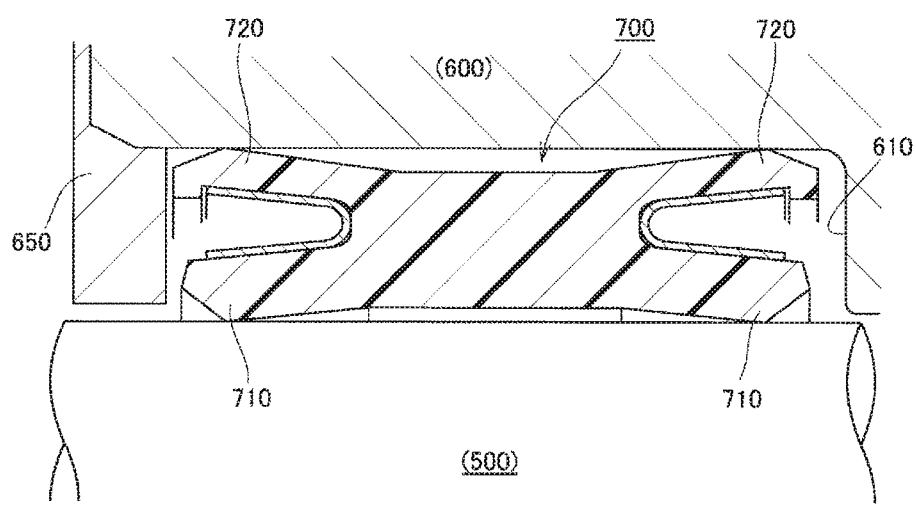
FIG. 4 is a schematic sectional view of a sealing structure in which a sealing device according to a reference example technique is used.

A sealing device according to an embodiment of the present disclosure is explained with reference to FIGS. 1 to 3. FIG. 1 is a schematic sectional view of the sealing device according to the embodiment. The sealing device has a substantially rotationally symmetrical shape. FIG. 1 shows a sectional view obtained by cutting the sealing device along a place including the central axis of the sealing device. Note that a direction in which the central axis of the sealing device extends will be hereinafter referred to as axial direction. FIG. 2 is a schematic sectional view of a resin seal ring according to the embodiment. FIG. 2 shows a sectional view of the resin seal ring taken along a plane including the central axis of the resin seal ring. FIG. 3 is a schematic sectional view of a sealing structure in which the sealing device according to the embodiment is used. FIG. 3 shows a sectional view of the sealing device taken along a place including the central axis of the sealing device.

<Sealing Structure>

An overview of the sealing structure in which the sealing device according to the embodiment is used is explained with reference to FIG. 3. A sealing device 10 according to the embodiment seals an annular gap between a shaft 500 and a housing 600 that move relative to each other. Note that the sealing device 10 according to the embodiment is applicable in each of cases where the shaft 500 and the housing 600 reciprocate relative to each other, where the shaft 500 and the housing 600 rotate relative to each other, where the shaft 500 and the housing 600 swing relative to each other, and where two or more of these movements are combined.

An annular cutout 610 is provided on the inner circumference surface of a shaft hole through which the shaft 500 is inserted in the housing 600. The sealing device 10 is mounted in the cutout 610. When the shaft 500 and the housing 600 move relative to each other, the sealing device 10 is maintained in a state in which the sealing device 10 is fixed to the housing 600. The sealing device 10 slides with respect to the outer circumference surface of the shaft 500 to maintain sealing performance.

<Sealing Device>

The sealing device 10 according to the embodiment is explained with reference to, in particular, FIGS. 1 and 2. The sealing device 10 includes a resin seal ring 100 made of resin, an elastic seal ring 300 made of a rubber-like elastic body attached to the outer circumference surface side of the resin seal ring 100, and spring members 200 made of metal. As the material of the resin seal ring 100, PTFE, PA, PEEK, PPS, ETFE, PFA, and the like can be applied. As the material of the elastic seal ring 300, NBR, FKM, EPDM, CR, and the like can be applied.

The resin seal ring 100 includes a cylindrical section 110, a pair of inner circumference lips 120 respectively provided on both sides of the cylindrical section 110 in the axial direction, and a pair of outer circumference lips 130 respectively provided on both sides of the cylindrical section 110 in the axial direction. An annular mounting groove 111, in which the elastic seal ring 300 is mounted, is provided on the outer circumference surface of the cylindrical section 110. The pair of inner circumference lips 120 is configured to be reduced in diameter with distance from the cylindrical section 110 both on the inner circumference surface side and the outer circumference surface side toward lip distal ends 121, which are configured to slide on the outer circumference surface of the shaft 500. The pair of outer circumference lips 130 is configured to be increased in diameter with distance from the cylindrical section 110 both on the inner circumference surface side and the outer circumference surface side toward lip distal ends 131, which are in close contact with the inner circumference surface of a shaft hole of the housing 600 (the inner circumference surface of a portion where the cutout 610 is provided).

The spring members 200 are mounted in annular recessed sections having a U-shaped cross section formed between the inner circumference lips 120 and the outer circumference lips 130. The spring members 200 include inner circumference pressing sections 210 (hereinafter, inner pressing section) that press the inner circumference lips 120 radially inwardly and outer circumference pressing sections 220 (hereinafter, outer pressing section) that press the outer circumference lips 130 radially outwardly. Note that stopper sections 132 for preventing the spring members 200 from slipping off are provided at the distal ends of the outer circumference lips 130. The spring members 200 are respectively provided between the inner circumference lips 120 and the outer circumference lips 130 respectively provided on both sides of the cylindrical section 110. Such spring members 200 make it possible to stably maintain sealing performance for a long period even if the inner circumference lips 120 and the outer circumference lips 130 in the resin seal ring 100 made of resin are plastically deformed over time.

In a state in which an external force does not act, the inner diameter of the cylindrical section 110 in the resin seal ring 100 is larger than the outer diameter of the shaft 500. In the state in which an external force does not act, the inner diameter of lip distal ends 121 of the pair of inner circumference lips 120 in the resin seal ring 100 is smaller than the outer diameter of the shaft 500. This allows only the vicinities of the lip distal ends 121 of the pair of inner circumference lips 120 in the resin seal ring 100 to slide on the outer circumference surface of the shaft 500 when the sealing device 10 is in use.

In the state in which an external force does not act, the outer diameter of the cylindrical section 110 in the resin seal ring 100 and the outer diameter of the vicinities of roots of the outer circumference lips 130 are smaller than the inner diameter of a part where the cutout 610 is provided in the shaft hole of the housing 600. In the state in which an external force does not act, the outer diameter of the lip distal ends 131 of the pair of outer circumference lips 130 in the resin seal ring 100 is larger than the inner diameter of the part where the cutout 610 is provided in the shaft hole of the housing 600. This allows only the vicinities of the lip distal ends 131 of the pair of outer circumference lips 130 in the resin seal ring 100 to be in close contact with the inner circumference surface of the shaft hole when the sealing device 10 is in use.

From the viewpoint of securing the rigidity of the resin seal ring 100, a groove width H of the mounting groove 111 is designed to be 20% or more and 40% or less of a maximum width H1 of the resin seal ring 100 in the axial direction. Because of the same reason, thickness T of the cylindrical section 110 of the resin seal ring 100 is designed to be 44% or more and 60% or less of a distance T1 from the inner circumference surface of the cylindrical section 110 to the opening end edge of the mounting groove 111.

The elastic seal ring 300 according to the embodiment is an O ring having a circular shaped cross section. In the state in which an external force does not act, the inner diameter of the elastic seal ring 300 is smaller than the outer diameter of the cylindrical section 110 (the outer diameter of the groove bottom surface of the mounting groove 111) in the resin seal ring 100. In the state in which an external force does not act, the outer diameter of the elastic seal ring 300 is smaller than the outer diameter of the lip distal ends 131 of the pair of outer circumference lips 130 in the resin seal ring 100 and is larger than the inner diameter of the part where the cutout 610 is provided in the shaft hole of the housing 600. This allows the elastic seal ring 300 to be in close contact with the groove bottom surface of the mounting groove 111 in the resin seal ring 100 and the inner circumference surface of the shaft hole in the housing 600 when the sealing device 10 is in use. Note that a compression ratio of the elastic seal ring 300 is designed to be 50% or less. Here, the compression ratio is calculated by $((D-D1) \div D) \times 100(\%)$, where D is a wire diameter of the elastic seal ring 300 in the state in which an external force does not act and D1 is a wire diameter of the elastic seal ring 300 in a compressing direction when in use. The above described O ring having a circular shaped cross section is one example of the elastic seal ring 300 in the embodiment and the elastic seal ring is not limited to such O ring. For example, the elastic seal ring may be a square ring having a rectangular cross section or a D ring having a D-shaped cross section.

<Advantages of Sealing Device According to the Embodiment>

The sealing device 10 according to the embodiment includes the elastic seal ring 300 made of the rubber-like elastic body configured to be in close contact with the inner circumference surface of the shaft hole of the housing 600 mounted in the annular mounting groove 111 provided on the outer circumference surface of the cylindrical section 110 in the resin seal ring 100. This prevents the resin seal ring 100 from moving with respect to the housing 600. Thus, the resin seal ring 100 is prevented from moving together with the shaft 500, thereby the sealing device 10 is prevented from moving together with the shaft 500. This prevents the sealing device 10 from coming into contact with the sidewall surface of the cutout 610 when the sealing device 10 is in use under a condition where the shaft 500 and the housing 600 reciprocate relative to each other. Consequently, it is possible to prevent deterioration in sealing performance. Further, since the sealing device 10 can be prevented from slipping off from the shaft hole of the housing 600 without measures such as forming an annular groove in the cutout 610 and the cutout 610 may remain as it is, the number of components does not increase.

When the sealing device 10 is in use under a condition where the shaft 500 and the housing 600 rotate or swing relative to each other, it is possible to prevent the outer circumference lips 130 from sliding on the inner circumference surface of the shaft hole of the housing 600. This prevents deterioration in sealing performance.

The pair of inner circumference lips 120 of the resin seal ring 100 is configured to be reduced in diameter with distance from the cylindrical section 110 both on the inner circumference surface side and on the outer circumference surface side toward the lip distal ends 121, which are configured to slide on the outer circumference surface of the shaft 500. This prevents parts other than the lip distal ends 121 from coming into contact with the outer circumference surface of the shaft 500, thereby the resin seal ring 100 can be more surely prevented from moving together with the shaft.

The pair of outer circumference lips 130 of the resin seal ring 100 is configured to be increased in diameter with distance from the cylindrical section 110 both on the inner circumference surface side and on the outer circumference surface side toward the lip distal ends 131, which are in close contact with the inner circumference surface of the shaft hole of the housing 600. This enables the pair of outer circumference lips 130 to easily bend radially inwardly. This allows the elastic seal ring 300 to be easily mounted in the mounting groove 111, thereby a load applied on the elastic seal ring 300 can be suppressed. Further, the elastic seal ring 300 can be more surely in close contact with the shaft hole inner circumference surface.

The elastic seal ring 300 provided on the outer circumference surface side makes it possible to more surely prevent a leak of sealed fluid from the outer circumference surface side of the sealing device 10. Since the inner circumference lips 120 and the outer circumference lips 130 of the sealing device 10 according to the embodiment are respectively provided on both sides in the axial direction, sealing performance is exerted on both sides in the axial direction.

REFERENCE SIGNS LIST

10 Sealing device
100 Resin seal ring
110 Cylindrical section
111 Mounting groove
120 Inner circumference lip
121 Lip distal end
130 Outer circumference lip
131 Lip distal end
132 Stopper section
200 Spring member
210 Inner pressing section
220 Outer pressing section
300 Elastic seal ring
500 Shaft
600 Housing

The invention claimed is:

1. A sealing device that is adapted for sealing an annular gap between a shaft and a housing that move relative to each other, the sealing device comprising:
a resin seal ring made of resin; and
an elastic seal ring made of a rubber-like elastic body, the elastic seal ring being attached to an outer circumference surface side of the resin seal ring and for being in close contact with an inner circumference surface of a shaft hole through which the shaft is inserted in the housing, wherein;
the resin seal ring includes:
a cylindrical section;
a pair of inner circumference lips respectively provided on both sides of the cylindrical section in an axial direction;
a pair of outer circumference lips respectively provided on both sides of the cylindrical section in the axial direction; and
an annular mounting groove which is provided on an outer circumference surface of the cylindrical section and in which the elastic seal ring is mounted,
each of the pair of inner circumference lips is reduced in diameter with distance from the cylindrical section both on an inner circumference surface side and an outer circumference surface side toward lip distal ends, which are configured to slide on an outer circumference surface of the shaft,
each of the pair of outer circumference lips is increased in diameter with distance from the cylindrical section both on an inner circumference surface side and an outer circumference surface side toward lip distal ends, which are configured to be in close contact with the inner circumference surface of the shaft hole, and
the elastic seal ring is provided only on the outer circumference surface side of the resin seal ring, wherein in an uninstalled state in which an external force does not act, the inner diameter of the elastic seal ring is smaller than the outer diameter of the cylindrical section in the resin seal ring and the outer diameter of the elastic seal ring is smaller than the outer diameter of the lip distal ends of the pair of outer circumference lips in the resin seal ring.

2. The sealing device according to claim 1, wherein a groove width of the mounting groove is 20% or more and 40% or less of a maximum width of the resin seal ring in the axial direction.

3. The sealing device according to claim 1, wherein a thickness of the cylindrical section is 44% or more and 60% or less of a distance from an inner circumference surface of the cylindrical section to an opening end edge of the mounting groove.

4. The sealing device according to claim 1, wherein the elastic seal ring includes a compression ratio of 50% or less, where the compression ratio is calculated by $((D-D1)\div D)\times 100(\%)$, D is a wire diameter of the elastic seal ring in a state in which an external force does not act, and D1 is a wire diameter of the elastic seal ring in a compressing direction when in use.

* * * * *